United States Patent [19]
Kutschenreuter, Jr.

[11] Patent Number: 5,546,745
[45] Date of Patent: Aug. 20, 1996

[54] SCRAMJET COMBUSTOR HAVING A TWO-PART, AFT-FACING STEP WITH PRIMARY AND SECONDARY FUEL INJECTOR DISCHARGE ORIFICES

[75] Inventor: Paul H. Kutschenreuter, Jr., Loveland, Ohio

[73] Assignee: General Electric Company, Cincinnati, Ohio

[21] Appl. No.: 266,069

[22] Filed: Jun. 27, 1994

[51] Int. Cl.$^6$ .................................................. F02K 7/10
[52] U.S. Cl. ............................................................ 60/270.1
[58] Field of Search ............................ 60/39.06, 204, 60/270.1, 740, 742, 743, 749

[56] References Cited

U.S. PATENT DOCUMENTS

| | | | |
|---|---|---|---|
| 4,903,480 | 2/1990 | Lee et al. ............................ | 60/270.1 |
| 5,081,831 | 1/1992 | Harshman ........................... | 60/39.06 |
| 5,082,206 | 1/1992 | Kutschenreuter, Jr. et al. ..... | 244/53 B |
| 5,085,048 | 2/1992 | Kutschenreuter, Jr. et al. ..... | 60/270.1 |
| 5,129,227 | 7/1992 | Klees et al. ......................... | 60/270.1 |
| 5,255,513 | 10/1993 | Kutschenreuter, Jr. et al. ..... | 60/204 |
| 5,280,705 | 1/1994 | Epstein et al. ...................... | 60/247 |
| 5,349,815 | 9/1994 | Kutschenreuter, Jr. .............. | 60/749 |

*Primary Examiner*—Timothy S. Thorpe
*Attorney, Agent, or Firm*—Andrew C. Hess; Patrick R. Scanlon

[57] ABSTRACT

A flight vehicle scramjet combustor is provided having two spaced-apart, generally opposing, and generally longitudinally extending walls extending forward and aft. One of the walls includes a generally aft-facing step, a forward wall portion extending generally longitudinally forward of the step, and an aft wall portion extending generally longitudinally aft of the step. The step further includes a first section and an interconnected second section, where in the first section is attached to the forward wall portion and the second section is attached to the aft wall portion. The second section includes a main or primary fuel injector discharge orifice and a plurality of secondary fuel injector discharge orifices positioned adjacent thereto, the primary and secondary fuel injector discharge orifices each having a fuel discharge axis aligned generally perpendicular to the second section which projects both generally toward the other of the walls and longitudinally aft.

19 Claims, 4 Drawing Sheets

SCRAMJET COMBUSTOR HAVING A TWO-PART, AFT-FACING STEP WITH PRIMARY AND SECONDARY FUEL INJECTOR DISCHARGE ORIFICES

BACKGROUND OF THE INVENTION

1. Field of the Invention

The present invention relates generally to a scramjet combustor for a hypersonic flight vehicle, and, more particularly, to a scramjet combustor having a two-part, aft-facing step with primary and secondary fuel injector discharge orifices for improved combustor performance over a wide range of hypersonic Mach flight numbers.

2. Description of Related Art

Hypersonic flight vehicles have been proposed which incorporate scramjet engines to achieve high Mach numbers. Once such a vehicle has achieved a sufficient speed by some other propulsive means (which may include a turbojet engine), a scramjet engine will take over to propel the aircraft to high Mach numbers (typically between Mach 6 and Mach 20). Such high Mach numbers cannot be achieved by any other known type of air-breathing engine.

A typical scramjet engine includes a combustor having a chamber, wherein a fuel-air mixture moving at supersonic speed is burned, and having at least one fuel injector which directs supersonically-moving fuel (such as pressurized hydrogen) into the chamber. The engine also includes an air inlet, which delivers compressed supersonically-moving air to the combustor chamber, and further includes an exhaust nozzle, which channels the burning gases out of the combustor chamber to help produce engine thrust. The fuel injector discharge orifices are the openings in the combustor chamber to which fuel is delivered by a fuel system which may include tanks, pumps, and conduits. In the case hydrogen fuel, the fuel-air mixture in the combustor chamber will have a high enough temperature and pressure to auto-ignite.

Known scramjet combustor designs include combustor walls having an aft-facing step and include an angled fuel injector located at the top of the step or a transversely-directed fuel injector located at the bottom of the step. Typically, known fuel injectors appear to be round conduits. "Angled" fuel injection means the injected fuel is not parallel or perpendicular (transverse) to the generally longitudinally-moving air. It is known in the art that as the flight Mach number increases above about Mach 10–12, a substantial and increasing portion of the engine thrust comes from the discharge of the pressurized fuel from the angled fuel injectors and not from the burning of that fuel. It is also known that angled or transverse fuel injection promotes significantly better fuel penetration into the airstream and better fuel-air mixing than can be achieved from axial injection. One scramjet combustor design which achieves adequate fuel penetration across the height of the combustion chamber with axial injection, without utilizing some type of fuel injector which protrudes into the airstream and thereby produces large thrust losses and increased fuel cooling requirements, is disclosed in U.S. Pat. No. 5,349,815, entitled "Scramjet Combustor Having a Two-Part, Aft-Facing Step" by Paul H. Kutschenreuter, Jr.

U.S. Pat. No. 5,349,815, which is hereby incorporated by reference, discloses a flight vehicle scramjet combustor having two spaced-apart, generally opposing, and generally longitudinally extending walls extending forward and aft. One of the walls includes a generally aft-facing step, a forward wall portion extending generally longitudinally forward of the step, and an aft wall portion extending generally longitudinally aft of the step. The step includes a first section and an interconnected second section. The first section is attached to the forward wall portion, while the second section is attached to the aft wall portion. The second section includes a fuel injector discharge orifice having a fuel discharge axis. The fuel discharge axis is aligned generally perpendicular to the second section, projects generally towards the other wall, and projects generally longitudinally aft. The fuel discharge orifice preferably has a generally rectangular shape with its two shorter sides generally aligned with the intersection of the first and second sections. Where the one wall is generally planer, the intersection of the forward wall portion and the first section preferably is a generally straight line having one end positioned longitudinally forward of its other end.

The scramjet combustor design of U.S. Pat. No. 5,349,815, provides several benefits and advantages over the prior art scramjet combustors, including excellent penetration and mixing of hydrogen fuel at scramjet flight Mach numbers as high as Mach 18 while recovering a significant amount of the axial fuel momentum without incurring intrusive drag losses. This is accomplished principally by the use of a large number of small, closely spaced narrow fuel injector discharge orifices or slots in the slanted step. However, it has been found that such a design is not as effective at lower flight Mach numbers (such as Mach 6–Math 9) since decreased inlet contraction ratios typically increase the combustor passage height on the order of 50%. Also, because decreased fuel cooling requirements permit significant reductions in fuel equivalence ratios compared to higher Mach number scramjet operation, the net result is that lower flight Mach number scramjet operation involves getting less fuel per unit airflow across a larger combustor passage height. Therefore, a scramjet combustor is needed which utilizes the two-part aft-facing step of U.S. Pat. No. 5,349,815, but is also able to operate more effectively over a wider range of hypersonic Mach flight numbers.

SUMMARY OF THE INVENTION

In accordance with one aspect of the present invention, a flight vehicle scramjet combustor is provided having two spaced-apart, generally opposing, and generally longitudinally extending walls extending forward and aft. One of the walls includes a generally aft-facing step, a forward wall portion extending generally longitudinally forward of the step, and an aft wall portion extending generally longitudinally aft of the step. The step further includes a first section and an interconnected second section, wherein the first section is attached to the forward wall portion and the second section is attached to the aft wall portion. The second section includes a main or primary fuel injector discharge orifice and a plurality of secondary fuel injector discharge orifices positioned adjacent thereto, the primary and secondary fuel injector discharge orifices each having a fuel discharge axis aligned generally perpendicular to the second section which projects both generally toward the other of the walls and longitudinally aft.

BRIEF DESCRIPTION OF THE DRAWING

While the specification concludes with claims particular pointing out and distinctly claiming the present invention, it is believed that the same will be better understood from the following description taken in conjunction with the accompanying drawing in which:

DETAILED DESCRIPTION OF THE INVENTION

Figure 1:
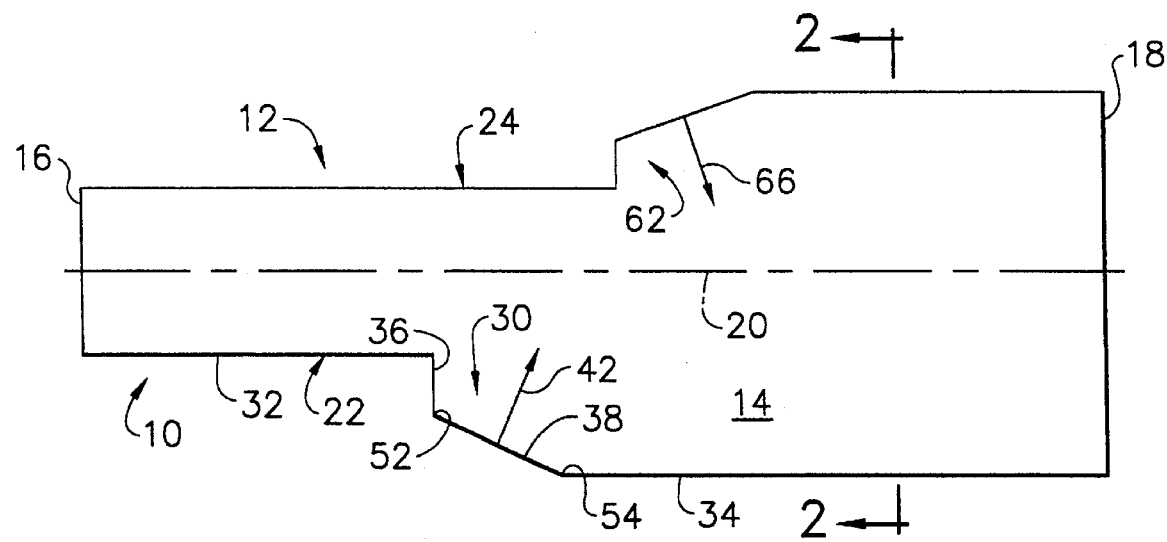
FIG. 1 is a schematic cross-sectional side view of a "two-D" type of scramjet combustor embodiment of that depicted in U.S. Ser. No. 07/750,343 showing the two-part step.

A flight vehicle scramjet combustor 10 (sometimes referred to as a "2-D" combustor) like that of U.S. Pat. No. 5,349,815 is shown in cross section in FIGS. 1,2, and 3, and includes a rectangular duct housing 12 forming a combustion chamber 14 and having a forward air-inlet orifice 16 communicating with the engine inlet (not shown) and an aft-outlet orifice 18 communicating with the engine exhaust nozzle (also not shown). The combustor's longitudinal axis 20 is defined by a line joining each orifice's center point (the orifice's "center of area"). The housing 12 includes two spaced-apart, generally opposing, and generally longitudinally extending walls 22 and 24, extending forward and aft. The walls 22 and 24 are connected together by two side walls 26 and 28 to form the generally rectangular duct-shaped combustion chamber 14.

One of the longitudinal walls 22 includes a generally aft-facing step 30, a forward wall portion 32 extending generally longitudinally forward of the step 30, and an aft wall portion 34 extending generally longitudinally aft of the step 30. The step 30 includes a first section 36 and an interconnected second section 38, with the first section 36 attached to the forward wall portion 32 and the second section 38 attached to the aft wall portion 34. The step 30 is a two-part step, which is defined as a step having two interconnected sections 36 and 38 with different slopes. Moving longitudinally aft along wall 22, it is seen that the step's first section 36 has a generally constant slope and the step's second section 38 has a different generally constant slope. Preferably, the first section 36 of the step 30 is generally perpendicular to the forward wall portion 32 of wall 22. The second section 38 includes a fuel injector discharge orifice 40a having a fuel discharge axis 42 which is aligned generally perpendicular to the second section 38 and which projects both generally towards wall 24 and longitudinally aft. It is noted that wall 22 has a generally planar shape longitudinally forward of the step 30 and a generally planar shape longitudinally aft of the step 30.

Figure 2:
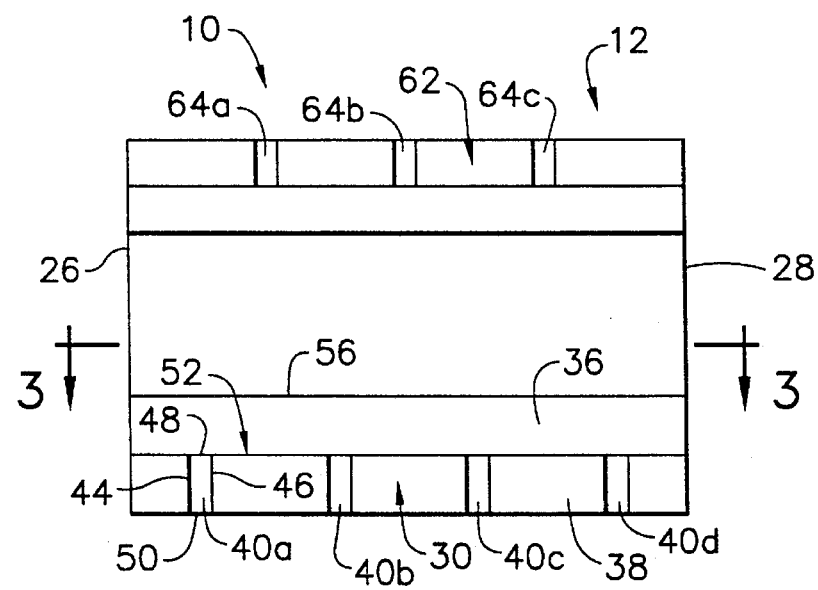
FIG. 2 is a schematic cross-sectional end view of the combustor of FIG. 1 taken along lines 2—2 of FIG. 1 showing the generally rectangular primary fuel injector discharge orifices.

As seen in FIG. 2, the fuel injector discharge orifice 40a, in an exemplary design, has a generally rectangular shape with two longer sides 44 and 46 and two shorter sides 48 and 50. The first and second sections 36 and 38 of the step 30 intersect along an intersection 52, and the two shorter sides 48 and 50 of the fuel injector discharge orifice 40a are each generally aligned with the intersections 52 and 54, respectively (see FIGS. 2 and 3). Preferably, the longer sides 44 and 46 of the fuel injector discharge orifice 40a extend generally between the intersection 52 of the first and second sections 36 and 38 of the step 30 and the intersection 54 of the second section 38 and the aft wall portion 34.

The second section 38 of the step 30 also includes additional fuel injector discharge orifices 40b, 40c, and 40d, which are laterally spaced from themselves and the fuel injector discharge orifice 40a. Preferably, the fuel injector discharge orifice 40a and the additional fuel injector discharge orifices 40b, 40c, and 40d are generally aligned in a generally laterally extending row.

Figure 3:
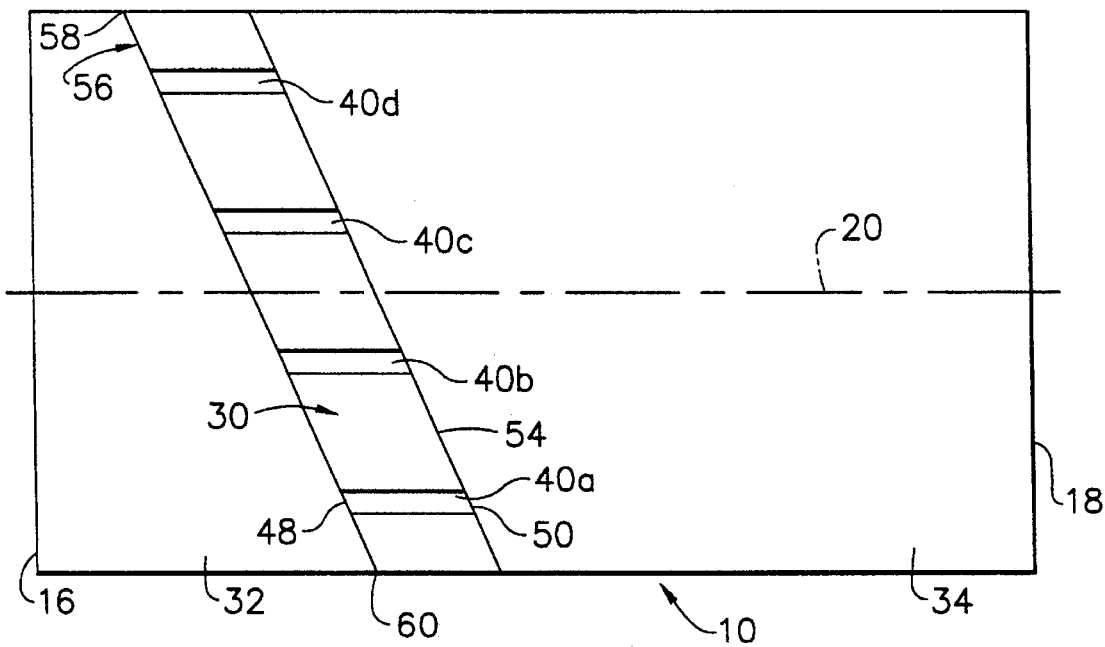
FIG. 3 is a schematic cross-sectional top view of the combustor of FIG. 1 taken along lines 3—3 of FIG. 2.

As seen in FIG. 3, the forward wall portion 32 and the first section 36 of the step 30 intersect along a generally straight line 56 having a first end 58 and a second end 60, and in an exemplary "swept-combustor" design the first end 58 is disposed longitudinally forward of the second end 60. The generally rectangular fuel injector discharge orifice 40a is seen in FIG. 3 to have slanted or "swept" shorter sides 48 and 50. It is noted that "generally rectangular" also includes fuel injector discharge orifices whose shorter sides are curved (as might be desired to minimize stress points).

Flight vehicle scramjet combustor 10 may include longitudinal wall 24 having a generally aft-facing step 62 which is identical to the step 30 in wall 22 Such step 30 of the wall 22 may be disposed longitudinally forward of the step 62 of the wall 24 (as seen in FIG. 1), or it may be longitudinally aligned with it. The step 62 of the wall 24 is seen to have a fuel injector discharge orifice 64a with a fuel discharge axis 66 and additional fuel injector discharge orifices 64b and 64c. As seen in FIG. 2, the fuel injector discharge orifice 64a and additional orifices 64b and 64c of the wall 24 are laterally offset from (although they could be laterally aligned with) the fuel injector discharge orifice 40a and additional orifices 40b, 40c, and 40d of the wall 22. In other applications, the side walls 26 and 28 may also have such steps.

In operation, supersonically-moving air enters the forward air-inlet orifice 16 of the flight vehicle scramjet combustor 10 and moves generally parallel to the combustor's longitudinal axis 20. The swept step 30 matches the sweep of the hypersonic flight vehicle inlet and engine cowl (not shown) to create uniform airflow conditions laterally across the step 30 allowing for a uniform fuel supply to the step's fuel injector discharge orifices 40a–40d. Fuel is injected at an angle along the fuel discharge axis 42 to provide for fuel injector discharge thrust. The fuel is injected below the top 56 of the step 30 with the first section 36 of the step 30 acting as a shield for the fuel against the airflow to minimize the possibility of engine shutdown due to injected fuel propagating upstream. The shielding effect also allows the injected fuel to spread before encountering the airflow, allowing for fewer but larger fuel injector discharge orifices 40a–40d, which allow greater fuel penetration. The rectangular orifices 40a–40d have their shorter sides 48 and 50 aligned to present a reduced orifice frontal area to the airflow for enhanced fuel penetration and to present an increased orifice side area to the airflow for enhanced fuel-air mixing. It is noted that there is no protrusion of the fuel injector into the airstream which would increase fuel cooling requirements.

As indicated hereinabove, the relatively small, closely spaced narrow fuel injector discharge orifices 40a–40d and 64a–64c have had great success at Mach 10–18. However, it has been found that the scramjet combustor at lower flight Mach numbers, such as Mach 6–9, is best served by larger, wider spaced fuel injector discharge orifices. This is due to a decreased inlet contraction ratio (and a corresponding increase in combustor passage height), as well as decreased fuel cooling requirements which permit significant reductions in the fuel equivalence ratio compared to higher Mach number scramjet operation. The net result is that lower flight Mach number scramjet operation involves getting less fuel per unit airflow across a larger combustor passage height.

Figure 4:
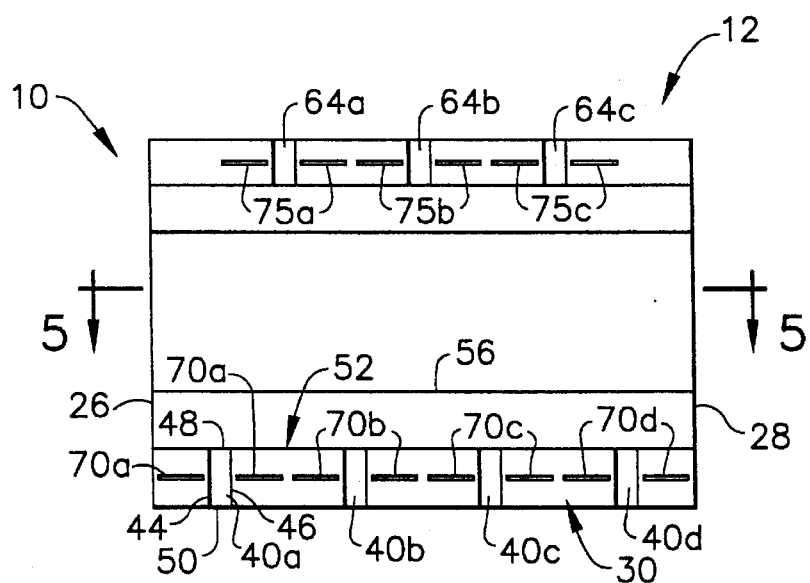
FIG. 4 is a schematic cross-sectional end view of the scramjet combustor of FIG. 1 which has been modified in accordance with the present invention where secondary fuel injector discharge orifices have been added.
Figure 5:
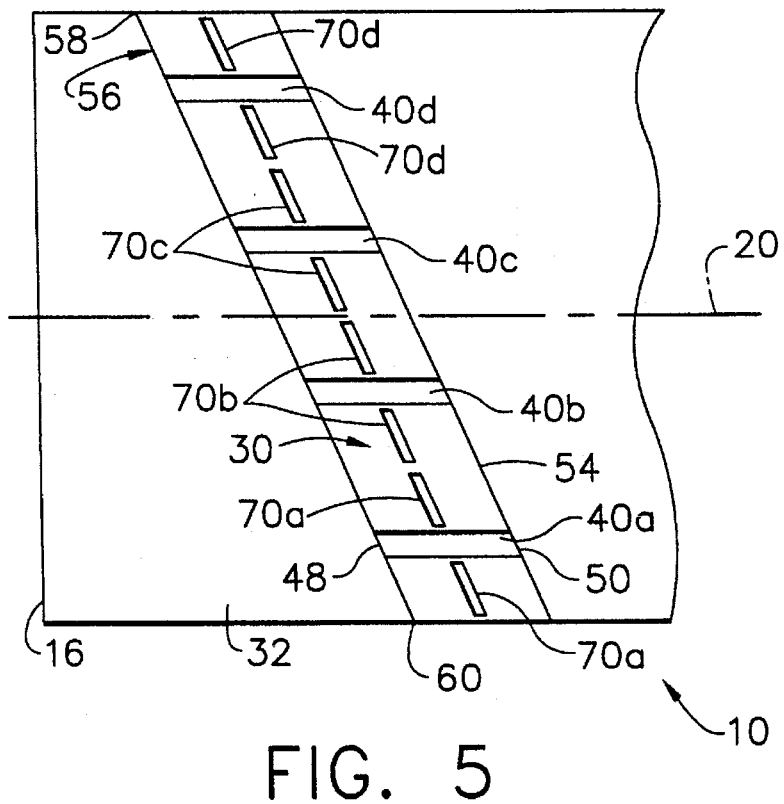
FIG. 5 is a schematic cross-sectional top view of the combustor of FIG. 4.

Accordingly, in conjunction with the present invention, a plurality of secondary fuel injection orifices 70a–70d and 75a–75c are provided adjacent each side of the main or primary fuel injection orifices 40a–40d and 64a–84c (see FIGS. 4 and 5) and preferably approximately midway between shorter sides 48 and 50 thereof. It will be understood that a fuel discharge axis extends from each secondary fuel injector discharge orifice 70a–70d which is aligned generally perpendicular to second section 38 of step 30 and projects generally toward wall 24 and longitudinally aft; thus, the secondary fuel discharge axes are parallel to primary fuel discharge axis 42. In this manner, the available effective area of the fuel injection orifices to combustion chamber 14 is increased. It is also understood that the system supplying fuel to primary fuel injection orifices 40a–40d and 64a–64c is preferably separate and independent from that for secondary fuel injection orifices 70a–70d and 75a–75c, such as by separately controlled plenum systems. Thus, the primary and secondary fuel injection orifices may be variably supplied with fuel dependent on the operating conditions of the aircraft without resorting to variable geometry of scramjet combustor 10.

More specifically, secondary fuel injector discharge orifices 70a–70d and 75a–75c will be supplied with fuel during lower Mach number flight (e.g., Mach 6–9), but not during higher Mach number flight (e.g., Mach 10–18). This will provide the desirable larger effective fuel discharge area at the lower flight Mach numbers, thereby increasing the penetration of fuel into combustion chamber 14 without resorting to excessive fuel pressure. Additionally, it will be understood that only certain secondary fuel injector discharge orifices, such as 70a and 70c with respect to primary fuel injector discharge orifices 40a and 40c and secondary fuel injector orifices 75a and 75c with respect to primary fuel injector orifices 64a and 64c (also, see secondary fuel injector discharge orifices 80a and 80c with respect to primary fuel injector discharge orifices 40a and 40c and secondary fuel injector discharge orifices 82a and 82c with respect to primary fuel injector orifices 64a and 64c in FIGS. 6 and 7), may be provided to increase the space between the larger effective area fuel orifices. In such a design, alternating primary fuel injector discharge orifices (e.g., 40a, 40c, 64a, and 64c in FIG. 4) would be supplied with fuel along with their associated secondary fuel injector orifices 70a, 70c, 75a, and 75c to maximize fuel-air mixing at a relatively low fuel equivalence ratios.

With respect to the relative sizing of primary fuel injector discharge orifices 40a–40d and 64a–64c to secondary fuel injector discharge orifices 70a–70d and 75a–75c, it has been determined that the overall effective area of the fuel injector discharge orifices (primary and secondary) needs to be variable up to four times the effective area of the primary fuel injector discharge orifices, with a preferred range of two-three times. Accordingly, the effective area of the secondary fuel injector discharge orifices should total up to three times the effective area of the primary fuel injector discharge orifices and preferably one-two times thereof.

Figure 6:
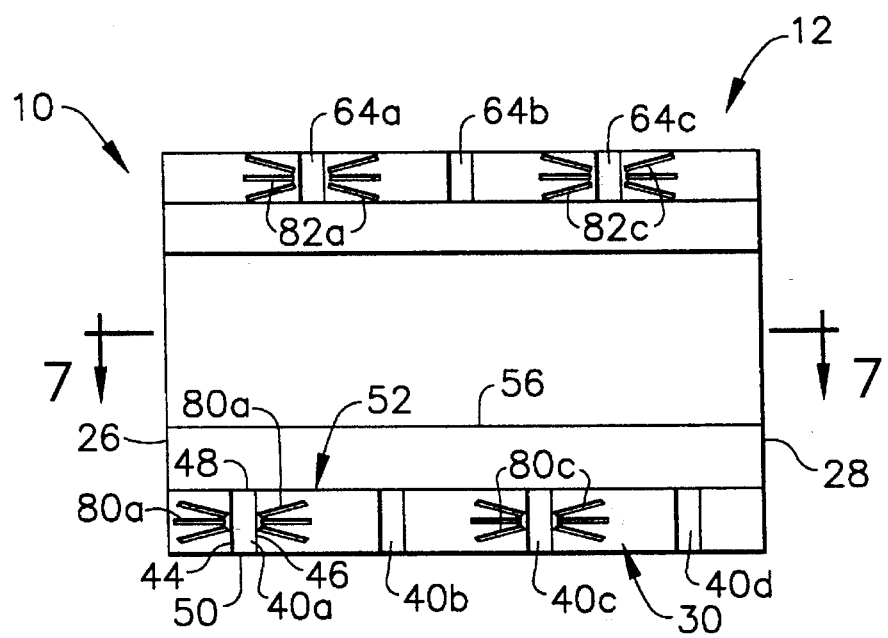
FIG. 6 is a schematic cross-sectional end view of a scramjet combustor like that of FIG. 4 depicting an alternative arrangement of the secondary fuel injector discharge orifices.
Figure 7:
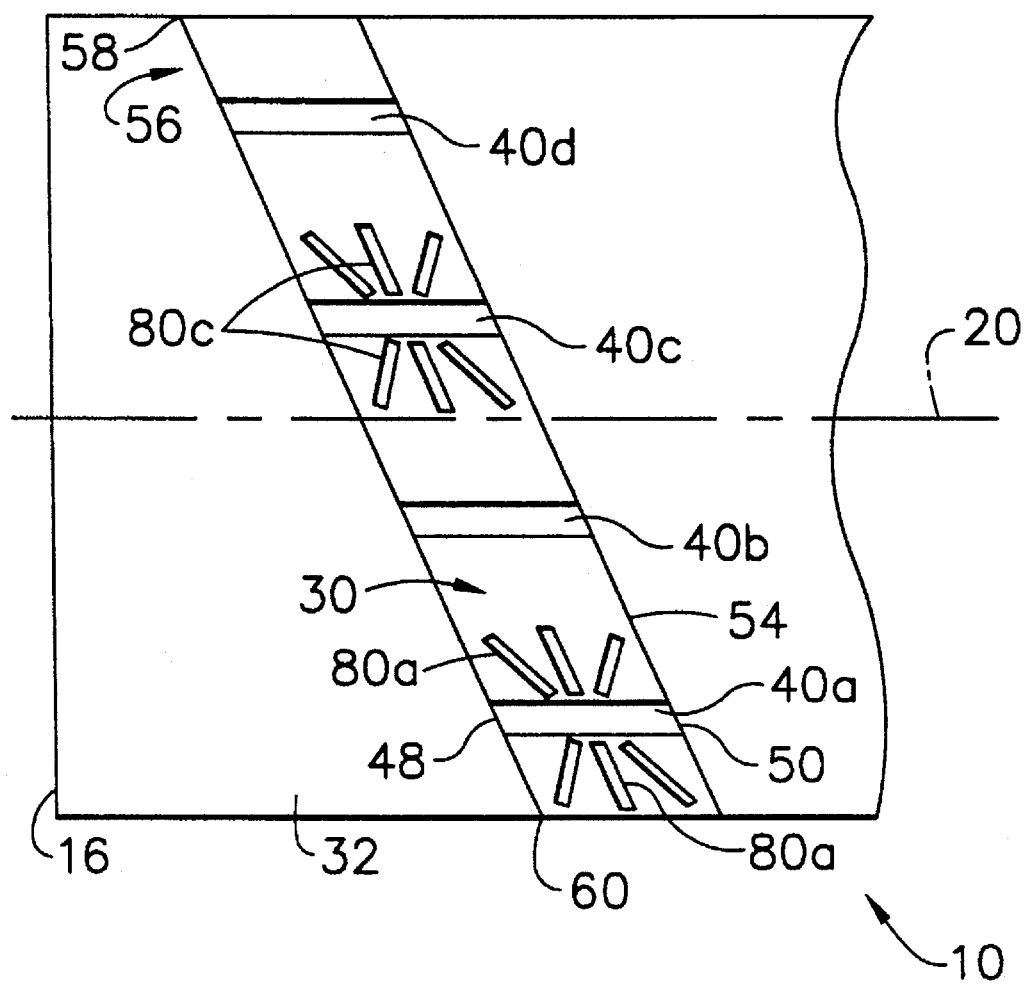
FIG. 7 is a schematic cross-sectional top view of the combustor of FIG. 6.

An alternative secondary fuel injector orifice design is depicted in FIGS. 6 and 7, where secondary fuel injector orifices 80a and 80c are shown adjacent primary fuel injector orifices 40a and 40c, and secondary fuel injector orifices 82a and 82c are shown adjacent primary fuel injector orifices 64a and 64c. There, it is seen that secondary fuel injector orifices 80a, 80c, 82a, and 82c approximate a semi-circle adjacent each of the longer sides 44 and 46 of primary fuel injector discharge orifices 40a, 40c, 64a, and 64c, respectively. In this manner, an even larger effective area is provided. It will also be noted that an even greater variety of fuel combinations is available.

As noted above, the systems for providing fuel to primary fuel injector discharge orifices 40a–40d, 64a–64c, and secondary fuel injector discharge orifices 70a–70d, 75a–75c, 80a, 80c, 82a and 82c are preferably independent. Accordingly, it is possible that different fuels could be supplied to combustion chamber 14 through each. For example, hydrogen fuel could be supplied through the primary fuel injector discharge orifices and hydrocarbon fuel through the secondary fuel injector discharge orifices, thereby increasing the bulk propellant density (compared to 100% hydrogen fuel) and permitting a smaller vehicle with less overall drag. Alternatively, the secondary fuel injector discharge orifices may be utilized to supply oxidizer addition such as oxygen during high Mach flight speed operation when fuel equivalence ratios exceed unity in order to achieve significant thrust augmentation.

Having shown and described the preferred embodiments of the present invention, further adaptations of the primary and secondary fuel injector orifices for a scramjet combustor having a two-part, aft-facing step can be accomplished by appropriate modifications by one of ordinary skill in the art without departing from the scope of the invention. This includes the number and shape of the secondary fuel injector discharge orifices adjacent the primary fuel injector discharge orifices, as well as the relative spacing between adjacent secondary fuel injector discharge orifices.

What is claimed is:

1. A flight vehicle scramjet combustor, comprising:
two spaced-apart, generally opposing, and generally longitudinally extending walls extending forward and aft, wherein one of said walls includes a generally aft-facing step, a forward wall portion extending generally longitudinally forward of said step, and an aft wall portion extending generally longitudinally aft of said step, said step further including a first section and an interconnected second section, wherein said first section is attached to said forward wall portion and said second section is attached to said aft wall portion, said second section including a primary fuel injector discharge orifice and a plurality of secondary fuel discharge orifices positioned adjacent thereto, wherein fuel is provided through said primary fuel injector discharge orifice and said secondary fuel injector discharge orifices by independent fuel supplies, said primary and secondary fuel discharge orifices each having a fuel discharge axis aligned generally perpendicular to said second section which projects both generally towards the other of said walls and longitudinally aft.

2. The combustor of claim 1, said second section also including a plurality of additional primary fuel injector discharge orifices and corresponding secondary fuel injector discharge orifices positioned adjacent each of said additional primary fuel injector discharge orifices, wherein said additional primary fuel injector discharge orifices are laterally spaced apart and generally aligned in a generally laterally extending row.

3. The combustor of claim 2, wherein all said primary fuel injector discharge orifices project fuel into said combustor when said flight vehicle is operating at a speed of approximately Mach 10 and higher.

4. The combustor of claim 2, wherein all of said primary fuel injector discharge orifices and said secondary fuel injector discharge orifices project fuel into said combustor when said flight vehicle is operating at a speed range of approximately Mach 6 to Mach 9.

5. The combustor of claim 1, wherein a ratio of the total effective area of said secondary fuel injector discharge orifices to the effective area of said primary fuel injector discharge orifice is approximately 1:1 to 3:1.

6. The combustor of claim 1, wherein different fuels are supplied through said primary and secondary fuel injector discharge orifices.

7. The combustor of claim 1, said second section also including a plurality of additional primary fuel injector discharge orifices and a plurality of secondary fuel injector discharge orifices positioned adjacent to only some of said additional primary fuel injector orifices, wherein said additional primary fuel injector discharge orifices are laterally spaced apart and generally aligned in a generally laterally extending row.

8. The combustor of claim 7, wherein said secondary fuel injector discharge orifices are positioned adjacent said primary fuel injector discharge orifice and alternating additional primary fuel injector discharge orifices.

9. The combustor of claim 1, wherein said secondary fuel injector discharge orifices are symmetrically arranged about said primary fuel injector discharge orifice.

10. A flight vehicle scramjet combustor, comprising:
two spaced-apart, generally opposing, and generally longitudinally extending walls extending forward and aft, wherein one of said walls includes a generally aft-facing step, a forward wall portion extending generally longitudinally forward of said step, and an aft wall portion extending generally longitudinally aft of said step, said step further including a first section and an interconnected second section, wherein said first section is attached to said forward wall port,on and said second section is attached to said aft wall portion, said first and second sections intersecting along an intersection, said second section including a primary fuel injector discharge orifice and a plurality of secondary fuel discharge orifices positioned adjacent thereto, wherein said primary fuel injector discharge orifice has a generally rectangular shape with two longer sides and two shorter sides, said two shorter sides each being generally parallel to said intersection.

11. The combustor of claim 10, wherein a secondary fuel injector discharge orifice is positioned adjacent each of said longer sides of said primary fuel injector discharge orifice.

12. The combustor of claim 11, wherein said secondary fuel injector discharge orifices are positioned approximately midway between said shorter sides of said primary fuel discharge orifice.

13. The combustor of claim 12, wherein said secondary fuel injector discharge orifices have a generally rectangular shape with two longer sides and two shorter sides.

14. The combustor of claim 13, wherein said longer sides of said secondary fuel injector discharge orifices are oriented substantially perpendicular to said longer sides of said primary fuel injector discharge orifice.

15. The combustor of claim 10, wherein a plurality of secondary fuel injector discharge orifices are positioned adjacent each of said longer sides of said primary fuel injector discharge orifice.

16. The combustor of claim 15, wherein each of said secondary fuel injector discharge orifices have a generally rectangular shape with two longer sides and two shorter sides.

17. The combustor of claim 16, wherein each of said secondary fuel injector discharge orifices is oriented so that said longer sides of at least two of said secondary fuel injector discharge orifices are at an angle to said longer sides of said primary fuel injector discharge orifice.

18. The combustor of claim 17, wherein said angle between each secondary fuel injector discharge orifice on one side of said primary fuel injector discharge orifice is of substantially equal magnitude to a corresponding secondary fuel injector discharge orifice on the other side of said primary fuel injector discharge orifice.

19. The combustor of claim 15, wherein said secondary fuel injector discharge orifices are symmetrically arranged about said primary fuel injector discharge orifice.

* * * * *